(12) United States Patent
Kato

(10) Patent No.: US 7,233,331 B2
(45) Date of Patent: Jun. 19, 2007

(54) PARALLEL OBJECT TASK ENGINE AND PROCESSING METHOD

(75) Inventor: Toshiaki Kato, Honolulu, HI (US)

(73) Assignee: Square Enix Co., Ltd., Tokyo (JP)

( * ) Notice: Subject to any disclaimer, the term of this patent is extended or adjusted under 35 U.S.C. 154(b) by 703 days.

(21) Appl. No.: 09/809,147

(22) Filed: Mar. 14, 2001

(65) Prior Publication Data

US 2001/0051971 A1   Dec. 13, 2001

Related U.S. Application Data

(60) Provisional application No. 60/190,329, filed on Mar. 16, 2000.

(51) Int. Cl.
*G06T 15/50* (2006.01)
*G06F 17/00* (2006.01)
*G06F 9/46* (2006.01)

(52) U.S. Cl. .................. 345/426; 345/418; 718/102

(58) Field of Classification Search ............. 718/100, 718/102, 104, 405, 107; 345/418–419, 426–427
See application file for complete search history.

(56) References Cited

U.S. PATENT DOCUMENTS 5,010,482 A  *  4/1991  Keller et al. ................ 710/52

(Continued)

FOREIGN PATENT DOCUMENTS

JP          04-151449         12/1993

(Continued)

OTHER PUBLICATIONS

Article, "IDF: A Graphical Data Flow Programming Language for Image Processing . . . ", 1990, IEEE, 90CH2930-6/90/000-0351, pp. 351-360.

(Continued)

*Primary Examiner*—Antony Nguyen-Ba
(74) *Attorney, Agent, or Firm*—Leighton K. Chong; Godbey Griffiths Reiss & Chong

(57) ABSTRACT

A parallel processing system and method for performing processing tasks in parallel on a plurality of processors breaks down a processing task into a plurality of self-contained task objects, each of which has one or more "data-waiting" slots for receiving a respective data input required for performing a computational step. The task objects are maintained in a "waiting" state while awaiting one or more inputs to fill its slots. When all slots are filled, the task object is placed in an "active" state and can be performed on a processor without waiting for any other input. The "active" tasks objects are placed in a queue and assigned to a next available processor. The status of the task object is changed to a "dead" state when the computation has been completed, and dead task objects are removed from memory at periodic intervals. This method is well suited to computer graphics (CG) rendering, and particularly to the shading task which can be broken up into task spaces of task objects for shading each pixel of an image frame based upon light sources in the scene. By allowing shading task objects to be defined with "data-waiting" slots for light/color data input, and placing task objects in the "active" state for processing by the next available one of an array of processors, the parallel processing efficiency can be kept high without wasting processing resources waiting for return of data.

18 Claims, 7 Drawing Sheets

U.S. PATENT DOCUMENTS

| | | |
|---|---|---|
| 5,179,637 A | 1/1993 | Nardozzi |
| 5,257,363 A * | 10/1993 | Shapiro et al. ............... 703/13 |
| 5,276,798 A | 1/1994 | Peaslee et al. |
| 5,371,849 A | 12/1994 | Peaslee et al. |
| 5,410,647 A | 4/1995 | Peaslee et al. |
| 5,546,530 A | 8/1996 | Grimaud et al. |
| 5,598,517 A | 1/1997 | Watkins |
| 5,673,380 A | 9/1997 | Suzuki |
| 5,710,700 A * | 1/1998 | Kurtzberg et al. ............. 700/29 |
| 5,719,598 A | 2/1998 | Latham |
| 5,757,385 A | 5/1998 | Narayanaswami et al. |
| 5,761,734 A * | 6/1998 | Pfeffer et al. ............... 711/164 |
| 5,794,016 A | 8/1998 | Kelleher |
| 5,798,770 A | 8/1998 | Baldwin |
| 5,821,950 A | 10/1998 | Rentschler et al. |
| 5,826,079 A * | 10/1998 | Boland et al. ............... 718/102 |
| 6,253,313 B1 * | 6/2001 | Morrison et al. ........... 712/226 |
| 6,370,560 B1 * | 4/2002 | Robertazzi et al. ......... 718/105 |

FOREIGN PATENT DOCUMENTS

| | | |
|---|---|---|
| JP | 11-140498 | 1/2000 |

OTHER PUBLICATIONS

Proceedings, IEEE Computer Graphics, "Distributing Control of Ray Tracing in Parallel", Jul. 1994, 0272-17-16/94, pp. 69-77.
Proceedings, IEEE Computer Graphics, "Sorting Classification of Parallel Rendering", Jul. 1994, 0272-17-16/94, pp. 23-32.

* cited by examiner

SPOT (Shading POT) object

Slot → SPOT → out

SPOT = data + function

SPOT Condition

Slot      RcvSlot

WAITING     ACTIVE     (DEAD)
execute by SPOT Engine Thread

PARALLEL OBJECT TASK ENGINE AND PROCESSING METHOD

This patent application claims the priority of U.S. Provisional Application 60/190,329 filed on Mar. 16, 2000, entitled "Parallel Object Task Engine and Method", by the same inventor.

FIELD OF THE INVENTION

This invention relates to the field of computer graphics and, in particular, to the use of an improved parallel processing method to obtain greater throughput in computer graphics rendering.

BACKGROUND OF THE INVENTION

Computer graphics (CG) systems create display images frame-by-frame from digital data representing mathematically-described objects in a scene. CG systems have been noteworthy recently in creating computer-generated special effects, animated films, interactive 3D video games, and other interactive or 3D effects in digital media. They are widely used for entertainment and advertising, computer aided design, flight simulation and training, and many other applications.

With today's very realistic, detailed, 3D graphics movies, such as Pixar's *Toy Story* series, there are two problems often encountered with CG computer hardware and software. First, the amount of data required to generate the images have grown to the gigabyte-level, which means that the data may not fit on a single workstation. Current 32-bit microprocessors limit the size of addressable memory to 4 gigabytes, and further limitations are imposed by the operating system. Virtual memory does not help in this case, because the processor and/or the operating system simply cannot manage a larger memory.

Second, complex scenes require a huge amount of computational power to process the required rendering tasks. It is typical for a full feature film-level CG scene to require hours of computation to render a single frame of final image to be printed to film. When multiplied by a frame rate of 24 frames/sec. and 1–2 hours for a movie, the computation time required is tremendous. In order to handle the intensive computation required for realistic imagery, computer graphics practitioners have developed different approaches using parallel processing methods to achieve greater throughput in generating CG images. The problem has been in finding a parallel processing scheme that is efficient and, at the same time, accommodates the implementation of a wide range of advanced graphics functions. A continuing challenge for all parallel processing schemes is to allocate the many tasks of the overall processing work among the processors so that none are overloaded or excessively idle.

One basic approach to parallel processing is a technique known as pipelining, in which individual processors are, in effect, connected in an assembly-line configuration. Each processor performs a set of operations on one chunk of data, then passes that chunk along to another processor which performs a second set of operations, while at the same time the first processor performs the first set operations again on another chunk of data. However, pipelining is generally suitable only for simple processing sequences where the same tasks are performed on all chunks of data and take roughly the same amount of time for each of the processors.

Another parallel processing strategy proposed assigning one or more three-dimensional objects to each processor module, in which each processor module produces pixel data from the objects. The processor outputs must be pipelined so that pixel data from each processor are combined with pixel data from other processors where objects in a scene overlap or have different types of lighting or viewing effects on each other. A major problem with this approach is the potential inefficiency of having objects of widely varying pixel sizes (array numbers) or lighting effects distributed unevenly among the processors, such that some processors are idle while others have too many pixels or processing steps to perform.

Another approach has been to assign each processor to perform all processing steps for pixels in a predetermined region of the image screen, for example, as described in U.S. Pat. No. 5,757,385, issued May 26, 1998 to Narayanaswami et al., assigned to IBM Corp., Armonk, N.Y. However, this approach imposes complex workload management programming requirements for allocating pixels and regions based upon the distribution of objects in the scene.

Yet another parallel processing strategy employed multiple whole-screen frame buffers matched to multiple processors, with each computing the whole screen but only a fraction of the total number of objects in the scene. The contributions to a pixel from each of the multiple screens are then combined. This simplifies the requirements for load balancing among processors by avoiding having to test each object for clipping and assignment to a given subregion of the scene. However, this approach creates a new problem in that each of the multiple whole-screen frame buffers for a single image requires substantial amounts of interprocessing to correctly form a composited image upon output.

Another approach, exemplified in U.S. Pat. No. 5,719,598 issued Feb. 17, 1998 to Latham, assigned to Loral Aerospace Corp., New York, N.Y., distributed polygon elements making up the objects in a scene among the processing modules. A scene data management processor selects and organizes the objects modeled with polygons and distributes the polygons to parallel geometry processing modules. The geometry processing modules convert the images from 3D to 2D screen coordinates and divide the polygons into constituent line elements or "spans". The spans are collected and sorted in order in a region buffer associated with each field of view. This approach also has the problems, discussed above, of potential inefficiencies in assigning polygons unevenly among the processors, and delays in pipelining the polygon outputs of the processors to a composited image based upon the most delayed processor.

One proposed solution specifically for CG scene rendering has been to use multiple CPUs running the rendering software in parallel, where the rendering tasks for a scene are broken up between the different CPUs so that each one renders some assigned part of the scene. This technique may be used whenever the scene data is too large to fit in a single processor. The scene is broken down into several layers, which may then be rendered by a renderer such as the RENDERMAN™ system of Pixar Animation Studios of Emeryville, Calif. However, this approach does not account for different CPU loads for different layers. Further, the software does not know how to divide a scene across the different CPUs, so human effort is required to do this job. The rendered images also require an additional step of compositing together the images generated by the different CPUs. Also, it does not allow for effects such as correct reflection across different objects, since the individual CPUs do not know about the CG data being rendered on the other processors.

A recent development employed by Square USA, Inc., based in Los Angeles, Calif., and Honolulu, Hi., is to have a group of processors that divide the scene data across different processors, and at the same time know about the data that other processors have, so that necessary data can be queried at any time. Square USA's in-house renderer takes this "data-parallel" approach to handle the large data size of CG scenes. The scene data are distributed among the different processors, and the processors communicate via message passing when one processor needs some computation performed by another processor.

Generally, two problems occur in distributed processing systems using message passing. Referring to FIG. 1, a typical parallel processing system employs a set of processing machines or CPU processors (Machine A, Machine B, etc.) to which different processing tasks (Task A, Task B, Task C, etc.) are assigned in order to perform them in parallel. In this example, Machine A performs a processing task on Task A, and Machine B performs a processing task on Task B. However, if Task A requires data input from another source, such as from Task B, to complete its task, then it sends a message to Task B and awaits its input. Task A in many cases cannot go on to further processing until it gets a reply from Task B. It is normal for many such situations to occur within a distributed processing system. In such a case, Task A will remain in a wait state and cannot go on to a next assigned Task C until the reply from Task B comes back. Thus, Machine A on which Task A is running will be used simply for waiting, thereby wasting a valuable CPU resource. Further, when executing large amounts of independent processing in parallel, the task management for each of the many processing tasks and assignments to the multiple processors, taking into account the independence and parallelism of each process, requires a huge development cost and experience on the part of the programmer, and is not a trivial task.

Accordingly, it is a principal object of the present invention to provide a parallel processing system and method that can effectively parallelize the processing of tasks in a parallel processing environment. A more specific object of the invention is to greatly reduce the amount of wasted time of a processor waiting for a return message from other tasks being processed in a parallel processing environment of the message-passing type. It is also a particular desired object to significantly improve the throughput of CG scene rendering by devising a way for the sequence of rendering tasks to be performed in parallel by minimizing the waiting time between tasks.

SUMMARY OF THE INVENTION

In accordance with the present invention, a parallel processing method for performing processing tasks in parallel on a plurality of processors comprises:

(a) breaking down a processing task into a plurality of self-contained task objects, wherein each task object is defined with a computational task and at least one "data-waiting" slot for receipt of data requested from another task object to which the processing task passes a message for the requested data, and wherein once all the "data-waiting" slots of a task object are filled by respective return message(s), the task object can perform its defined computational task without waiting for any other input;

(b) scheduling the defined task objects to be processed by distributing them across the plurality of processors, by:

(i) placing a task object with an unfilled "data-waiting" slot in a "waiting" state in which it is not assigned to any processor;

(ii) changing the status of a task object to an "active" state when all of its defined "data-waiting" slots have been filled, wherein it is assigned to a next available processor in an "unoccupied" state, then placing that processor's status in an "occupied" state; and (iii) changing the status of the task object to a "dead" state when the computational task to be performed for the task object by the assigned processor has been completed, and then changing the processor's status to an "unoccupied" state to be assigned to a next "active" task object.

In a preferred implementation of the invention, a master task grouping is defined by a plurality of task spaces each of which contains multiple task objects and does not require data access from an external source. All task objects in the "active" state from any of the task spaces are placed on the queue, and each is assigned in turn to a next available "unoccupied" processor. A master engine maintains threads for tracking the processing of task objects in the task spaces. The master task grouping maintains an internal space address assigned to each respective task object. A task object in one master task grouping can exchange data with a task object in another master task grouping by providing its internal space address indexed to the master task grouping.

The methodology of the invention is especially well suited for parallel processing systems of the message-passing type, and particularly for computer graphics rendering. In a CG rendering implementation of the invention, a rendering task for an image frame of a scene includes a master task grouping of shading task spaces for shading points of an object intersected by an eye ray in the image frame. Each shading task space includes a plurality of "point shading" task objects for performing shading of a point based upon light sources in the scene, and a "compositing" task object for compositing the shading results for the point. Each shading task object has at least one "data-waiting" slot for return of data characterizing light emitted from a respective light source in the scene. All shading task objects in the active state from any of the shading task spaces of the shading task grouping are placed on a queue and each is assigned in turn to a next available "unoccupied" processor of the CG processor array.

Other objects, features, and advantages of the present invention will be described in further detail below, with reference to the following drawings:

DETAILED DESCRIPTION OF INVENTION

A preferred implementation of the parallel processing method and system of the present invention is described in detail below using the example of computer graphics rendering performed in a parallel processing environment of the message passing type. However, it is to be understood that the general principles of the invention have broad applicability to analogous types of parallel processing environments and computationally intensive applications.

In the example described in detail below, a computer graphics rendering application is performed in a UNIX™ programming environment. For example, the CG rendering application may be performed on SGI™ workstations running IRIX™ operating systems, as are available commercially from Silicon Graphics Inc., of Mountain View, Calif., or even on standard IBM PC-compatible computers running the LINUX™ operating system.

A CG development platform is used to create an overall CG media program and accompanying database of scenes and objects, such as the MAYA™ development platform offered by Alias Wavefront, Inc., of Toronto, Ontario, Canada, which is a subsidiary of Silicon Graphics, Inc. The MAYA™ development platform is a 3D modeling, animation, and rendering software package that has advanced interface, workflow, flexibility, and depth features. MAYA includes many tools used for modeling and animation, including setting keyframes and constraints, inverse kinematics, attaching surfaces to skeletons, character modeling, nurbs modeling, character expressions, particle and dynamics suites for rigid and soft bodies, texturing, and tools for rendering including node-based shaders, anti-aliasing, motion blur, and selective raytracing/raycasting. At the heart of MAYA is MEL, its scripting language. Every action, every part of the interface, and every tool is invoked and described by MEL. It is, therefore, possible to create new tools, combinations of tools, completely modify the interface, and tie MAYA in with other software programs using MEL. The parallel processing system of the invention can be implemented using the MEL scripting language, or by implementing a "hook" in MEL which will invoke external programs written in other programming languages such as C++.

Figure 1:
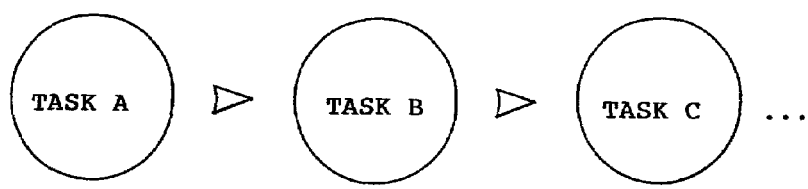
FIG. 1 is a schematic illustration of the problem of waste of waiting time in parallel processing of tasks on parallel processors.
Figure 1:
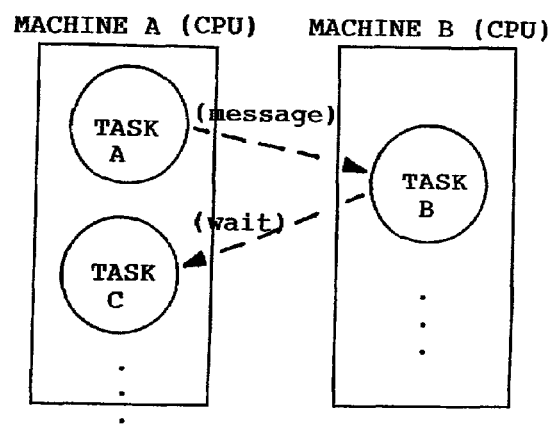

The developed CG media program and data files, referred to as "SHOT" data files, can then be rendered into a visual display of the CG media program. The rendering process operates on a "World Task" which invokes many different rendering tasks. The many rendering tasks include many independent operations which lend themselves to efficiencies obtained by parallel processing using multiple CPUs. However, as described above with respect to FIG. 1, the previous approaches to parallel processing have resulted in many instances of waiting time wastage which can obviate the advantages of parallel processing.

Figure 2:
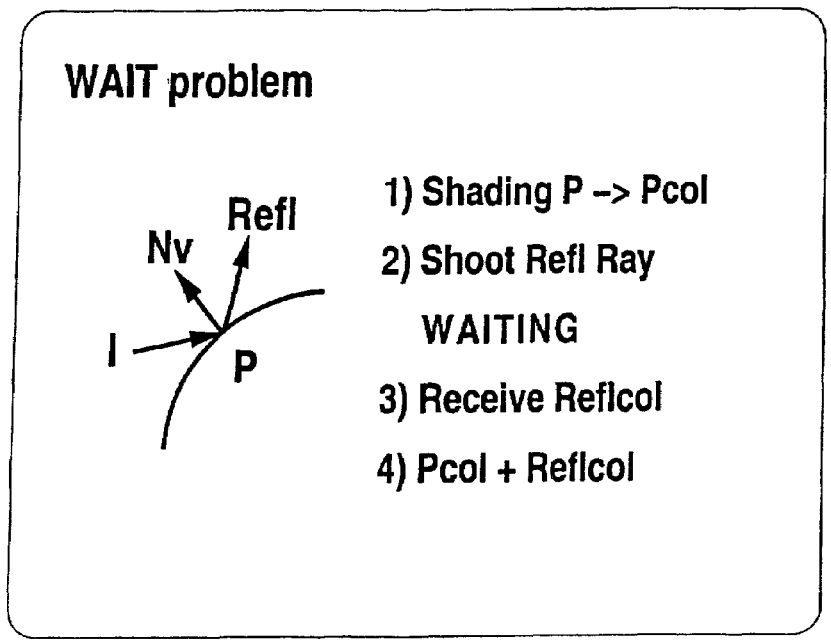
FIG. 2 is an illustration of the wait problem in a shading task for the rendering of a computer graphics image.

For a typical shading task of the rendering process, as illustrated in FIG. 2, shading requires computing the surface color of point P, a point on a reflective surface in the scene, as seen by the viewpoint I. The surface color of point P will have two parts. First, the color information Pcol can be computed from the object surface's information itself, mainly the surface characteristic and the color properties of the object, and the lighting information of the lights which hit affect the point. Because point P is a point on a reflective surface, a secondary computation needs to be performed as well. In this case, the reflection vector must be computed relative to the surface normal Nv, then perform a space traversal, then calculate if the reflection vector hits some other object in the scene space. The space traversal computation is typically handled by a separate task. The shading task must send a request to a separate, reflected color computation task in the form of a message for the computed Reflcol, and the space traversal task must also be computed to determine which object the reflection vector will hit separately. The information is retrieved as the processed output of another shading request, and the color of the reflection vector's target must be determined. The computed reflected color information will be sent back to the shading task which initially computed the reflection vector, and once the Reflcol information is received, the initial shading task can complete its computation of Pcol+Reflcol, and then will be able to go on to the next step in the shading process. In this manner, many situations will arise in the shading computation for a single point on a surface needs to call other functions within separate processes, and wait for the result. If the shading process were to wait for the return value every time this occurs, the message passing overhead will pile up until the value of the system's parallelism is completely lost.

Figure 3:
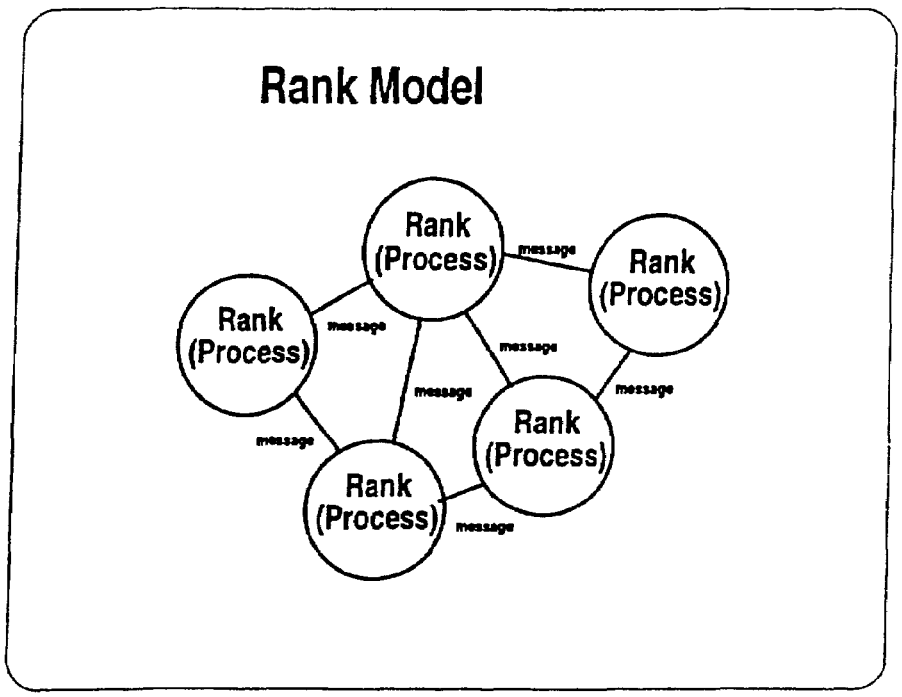
FIG. 3 is an illustration of a parallel processing environment of the message passing type on which the present invention is based.

Referring to FIG. 3, the rendering tasks are conventionally grouped together into processes which have a common mode and can proceed according to a described order or "Rank". The Rank processes communicate among each other by message passing. If processing is halted in each Rank process awaiting results to be returned by another Rank process, the advantages of using parallel processing for the rendering tasks can be easily lost.

Figure 4:
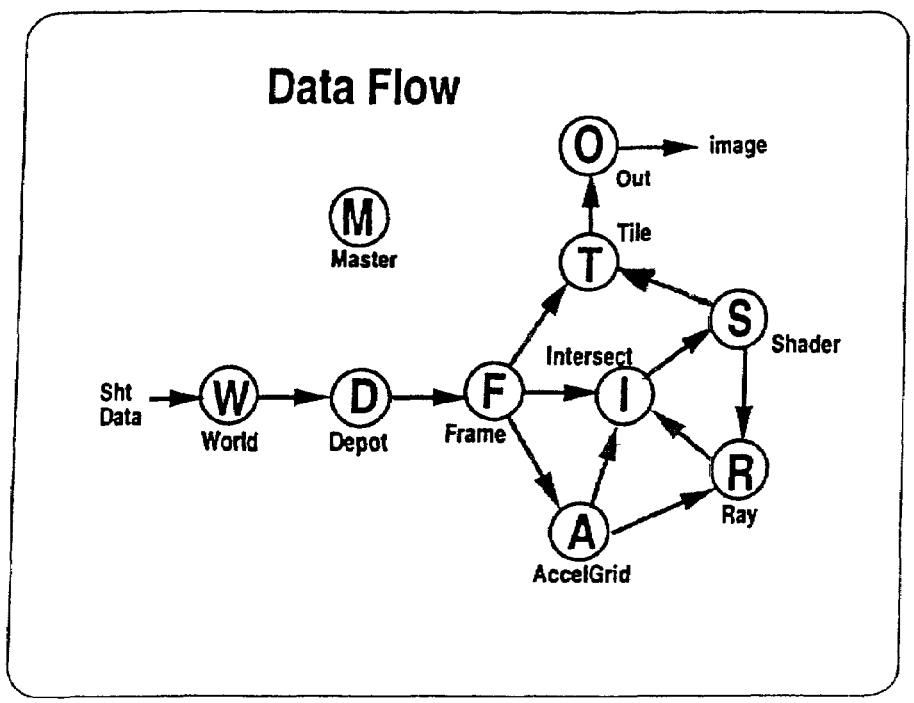
FIG. 4 is an illustration of the data flow in a typical computer graphics rendering application.

In FIG. 4, the data flow for a typical shading task of a rendering process is illustrated. The rendering process is referred to as the Master process M. The Master process M executes a World Task W. based upon "Shot data" representing the scene and objects in the scene as developed for the CG media program, i.e., movie or video game. The required data and program sequence are held in a data Depot D and accessed for rendering each image Frame F. Each Frame F is rendered by rendering the viewer's eye view of objects in the scene. The viewer's eye view is represented by an array of eye rays computed by the AccelGrid function A, and the intersections of the eye rays with 3D objects in the scene are computed by the Intersect function I. For each point of an object intersected by an eye ray, the Shader function S is invoked. The Shader function takes into account the surface characteristics of the object to generate one or more Raytracer process(es) R from light sources in the scene. The light sources may be, for example, emitted, reflected, ambient, and/or diffused light in the scene. When light data has been returned by the Raytracer process(es), the Shader function S can compute the shading of the point.

When the points of an object have been shaded, the Tile process T is invoke to composite the shaded objects together into an Output O and displayed as the frame image.

Figure 5:
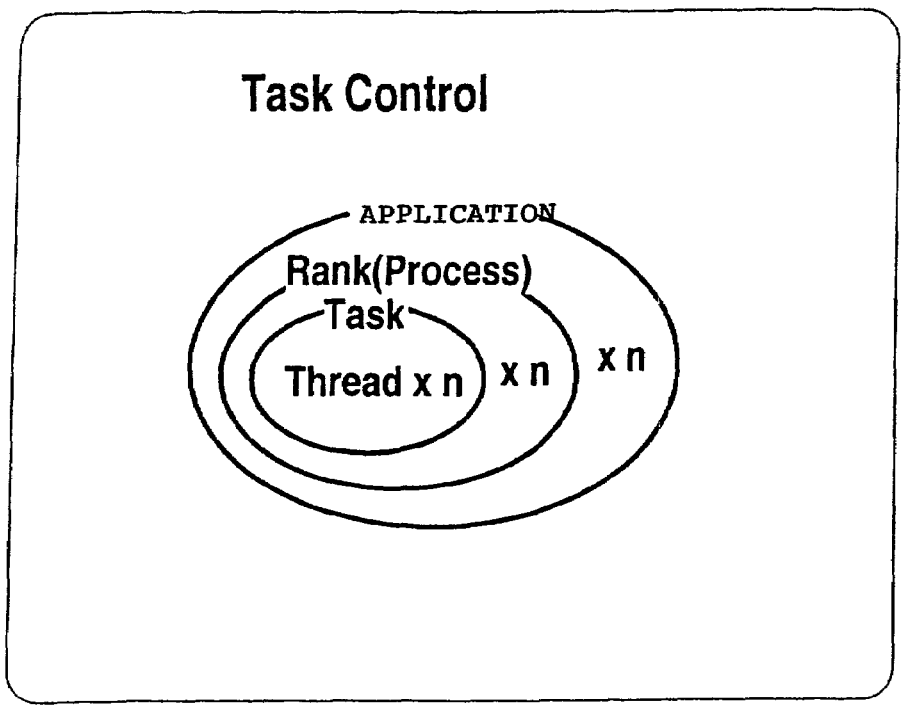
FIG. 5 is an illustration of task control in parallel processing of a processing application.
Figure 6:
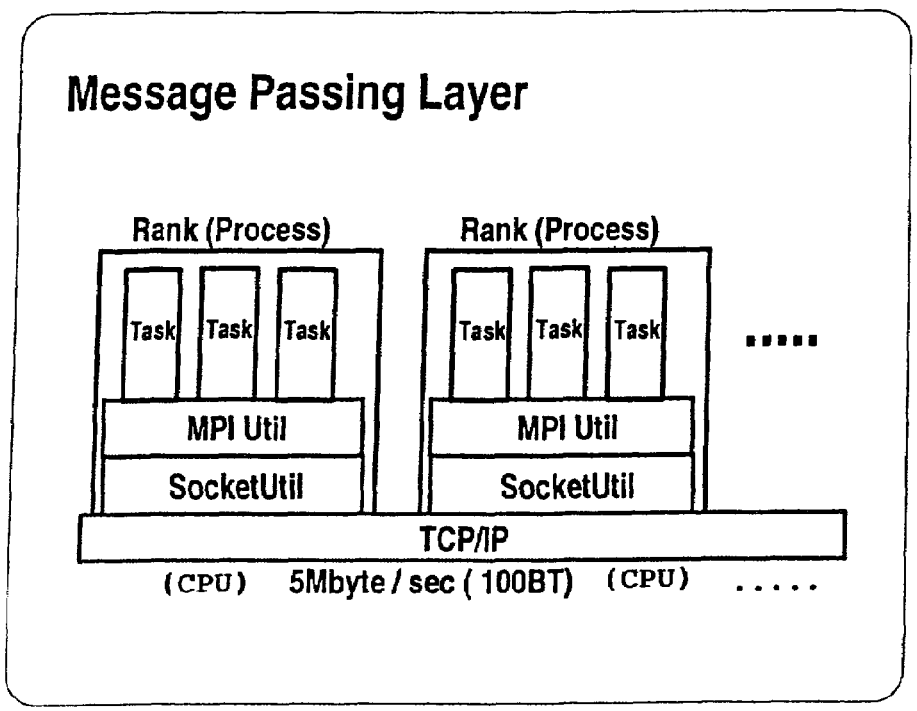
FIG. 6 is an illustration of the message passing layer in parallel processing of a processing application.

As illustrated in FIG. 5, the task control of the Master rendering process can be visualized as depth nesting of many Rank processes, each encompassing many Rendering Tasks, each encompassing many Threads of computation. The message passing interface between Rank processes and Tasks is illustrated in FIG. 6. A Message Passing Interface (MPI) utility is operative to pass messages from the Tasks to a Socket Utility operative with each defined Rank process. The Socket Utility enables the messages to be transmitted on a data bus or network (indicated as TCP/IP) which connects the Rank processes to an array of parallel processors (CPUs).

In the present invention, a parallel object task (POT) Engine is created to handle the parallel processing of rendering tasks. The POT Engine is implemented as a C++ class library, making it possible for programmers to develop the parallel message passing system more securely and easily, writing each operation in accordance with the POT Engine's design. The POT Engine can be considered to be a very large waiting queue of tasks which are to be executed in parallel as independent operations.

The POT Engine includes one or more POT Master task groupings which in general are groupings of tasks according to a chosen task control methodology. For the example of a POT Engine for the rendering process, the shading task, which is accomplished by a parallel ray tracer using message passing, is implemented in a POT Master task grouping as a plurality of Shading POT (or SPOT) Spaces.

Figure 7:
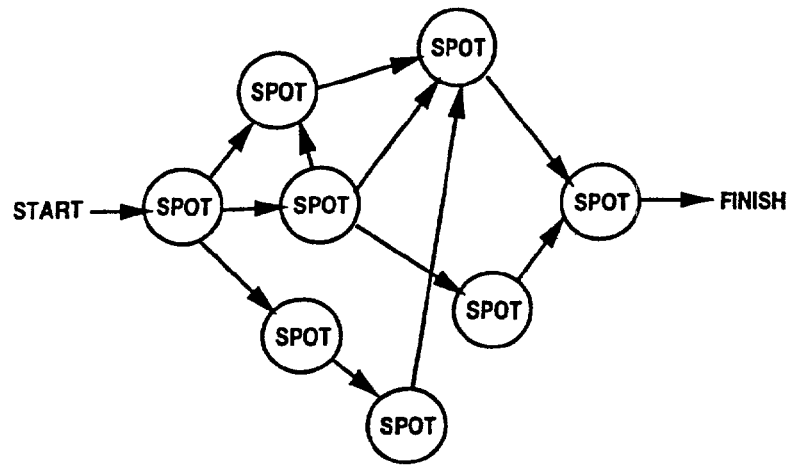
FIG. 7 is an illustration of the data flow in a typical shading task of a computer graphics rendering application.

Referring to FIG. 7, each SPOT Space can be a network of elemental shading tasks, with some elemental shading tasks requiring data from other elemental shading tasks before they can finish. Each elemental shading task is referred to as a "SPOT Object", and is defined as a processing task which is self-contained, requires a data input from another SPOT Object or external process, and, once the data input becomes available, can be executed in one computational step without having to wait for data in order to complete its task. The SPOT Space can be visualized as a network of SPOT Objects which proceeds from a START point through the SPOT Objects as they pass the results of their individual computations on to the next SPOT Objects until the task of the SPOT Space reaches a FINISH.

Figure 8:
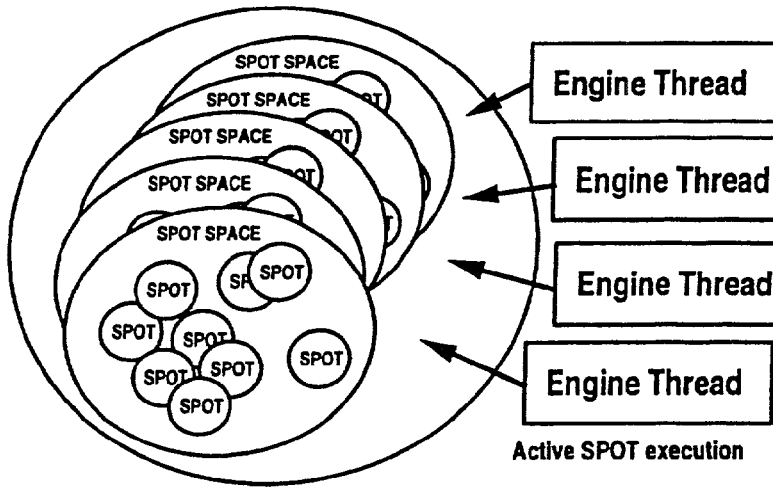
FIG. 8 is an illustration of a master task engine for a plurality of defined shading task spaces each containing a plurality of defined shading task objects.

In FIG. 8, a SPOT Engine can be visualized as comprising a large number of Engine Threads used to monitor the processing of SPOT Objects in a plurality of SPOT Spaces in a POT Master. Each POT Engine Thread seeks out POT Objects in an active state in a POT Space, and assigns them for processing. Each POT Master may start up multiple POT Engine Threads. An active POT Object is executed by one and only one POT Engine Thread, and multiple POT Engine Threads will never execute the same POT Object simultaneously. As each POT Object becomes ready to be processed, referred to herein as the "active" state, it is placed in a queue to be assigned to a next available processor. The assigned processor can then perform the computation required for the POT Object without having to wait for any data to be passed from another object, task or process. When the computation is completed, the results are passed to the next POT Object as designated by the Engine Thread that needs the results for its computation, and the now available processor is assigned another active POT Object on the queue. POT Masters with multiple POT Engine Threads can be expected to execute multiple POT Objects efficiently in parallel, and thus increases the parallel execution efficiency in a machine with multiple CPUs.

Figure 9:
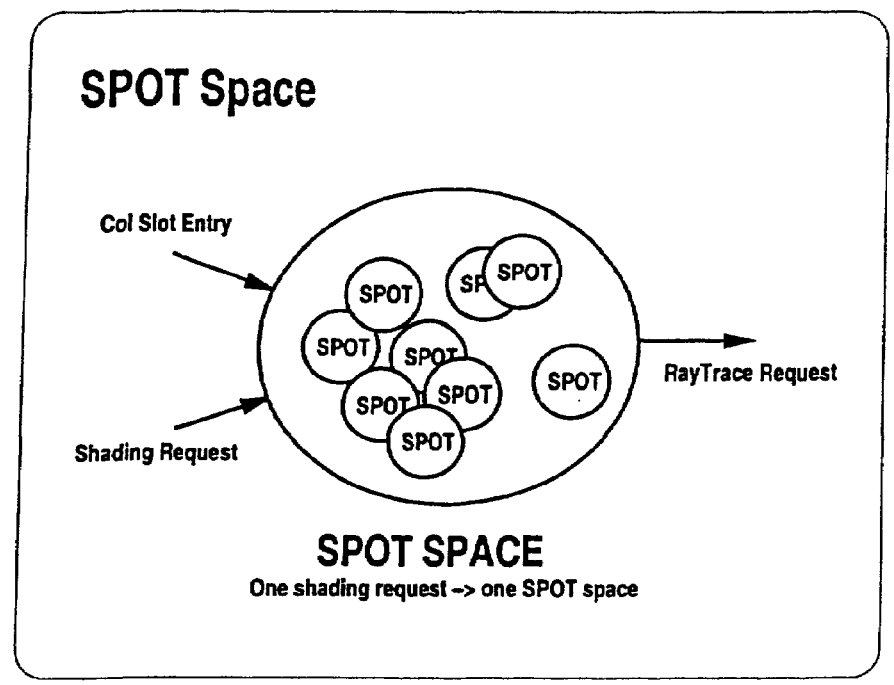
FIG. 9 is an illustration of a shading task space as defined by a shading request in an overall CG rendering task.

Referring to FIG. 9, a SPOT Space for a shading task can be visualized as initiated by receipt of a Shading Request. The Shading Request can initiate a number of Shading SPOT Objects for the different points in the 3D scene to be shaded. The Shading SPOT Objects issue a plurality of RayTrace requests for the different light elements in the scene contributing to the lighting of the point. The Shading SPOT Objects also have a slot awaiting color data Col for each RayTrace request it issues. When all the RayTrace data are returned in the slots, the Shading SPOT Objects can complete their computational tasks.

Figure 10:
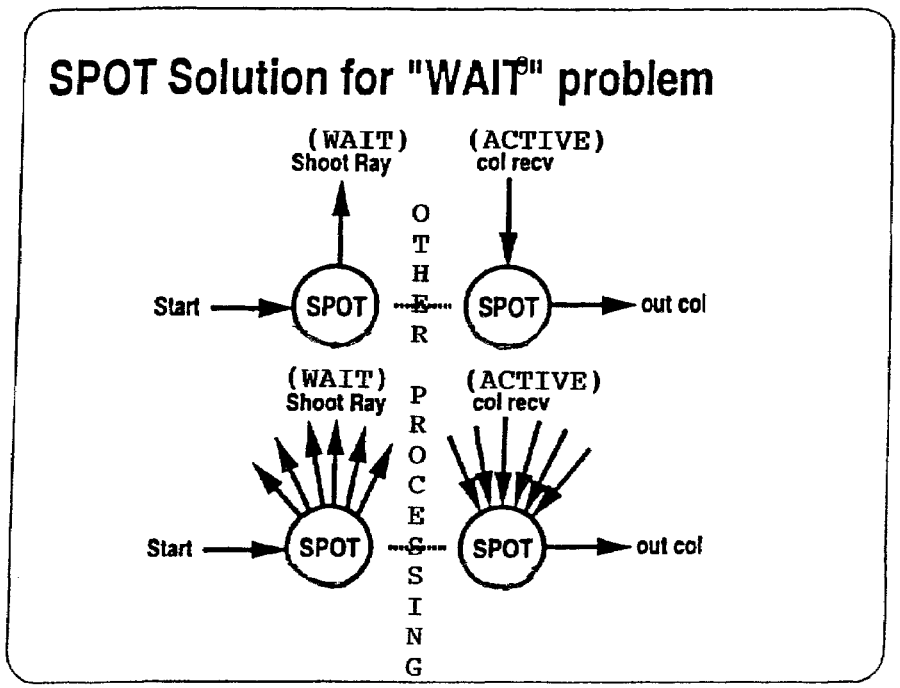
FIG. 10 is an illustration of solving the waiting problem in shading task execution by defining inactive and active states for shading task objects in the shading task.

In FIG. 10, the solution in the present invention to the "wait" problem of tying up parallel processing resources is illustrated. When a SPOT Object sends a RayTrace request and is waiting for data, it is placed in a "wait" state, and processing resources will not be allocated to it. In some cases, multiple RayTrace requests may be sent by a SPOT Object requiring multiple data inputs to be returned. When all the data becomes available, the status of the SPOT Object is changed to "active" and placed on the queue to be processed by the next available processing resource. In this manner, the parallel processing resources are more or less continuously occupied and are not wasted by waiting for data. The processors need not wait for an entire SPOT Space to be completed before it is assigned a new SPOT Object.

In implementing a shading task, each point of a surface's shader computation is implemented as a SPOT Space, and each SPOT Space may require multiple SPOT Objects to compute each of the respective RayTracing requests for that pixel. The parallel processing resources are continuously occupied with executing the many SPOT Objects of the SPOT Spaces that are in the active state, and not waiting for a SPOT Space to finish its computation. In this manner, multiple shading computation objects can be executed in parallel. Therefore, by implementing shading with the POT Engine, the message transmission latency inherent in message passing systems is negated, and parallel processing efficiency is increased.

Programming Considerations

From a programming perspective for the tasks of a parallel processing application in general, a POT Master contains all the functionality and data for a single POT Engine. Basically, all the functionality required for managing the POT Engine is implemented within the POT Master, and programmers can program without thinking about its internal workings at all. It is possible for multiple POT Masters to exist within a single program. However, each POT Master is designed to operate independently of others, and its internal data (POT Spaces, POT Objects) may not directly access other tasks or processes than that of the POT Master they belong to. Multiple POT Spaces can exist within a POT Master, and each POT Space contains multiple POT Objects that can be executed in parallel. A POT Space's internal data (POT Objects) may not access other POT Spaces than the one they belong to. A POT Space defines a single closed process, and if multiple such processes are required, multiple POT Spaces can be created within the POT Engine to accommodate that.

Figure 11:
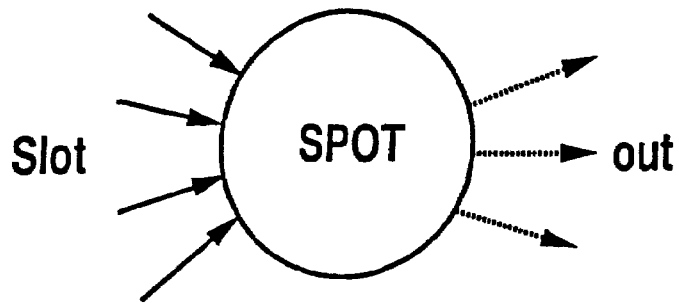
FIG. 11 is an illustration of the basic elements of a shading task object.

Referring to FIG. 11, a POT Object is the smallest unit for program execution. The POT Master, which manages the queue for the POT Objects, will assign the complete execution of a POT Object to a processor before the processor can be assigned to the next POT Object. Each POT Object contains one or more "slots" for receipt of data from an external source. The data received by a slot can also specify a function to be performed by the POT Object. Also, it is possible for a POT Object to contain variables for internal use. Therefore a POT Object is an object in an object-oriented programming sense, and is implemented as a C++ class. Programmers can code the desired operations and data into the POT Object, as well as define input slots for receiving data from external sources, by extending the basic POT Object.

Figure 12:
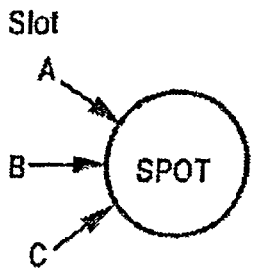
FIG. 12 is an illustration of the "waiting", "active", and "dead" states of a shading task object.
Figure 12:
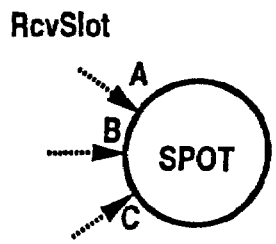
Figure 12:

As illustrated in FIG. 12, a POT Object whose slot has been defined but currently has no data set in the slot is said to be in the "waiting" state. A POT Object in this state will not be assigned to a processor nor be executed. Only after data values are set in all the defined slots will the status of the POT Object be changed to active state, signifying that it is ready for execution. POT Objects within the same POT Space may write to each other's data slots by specifying the POT Space Address (PSA) of the target POT Object. The PSA is defined as a data structure containing 1) the physical address of the POT Object, as assigned by the standard C++ "new" operator, 2) the rank id of the POT Object, which specifies the type of the computation being performed, and 3) The slot ID the data will be stored in. When the processing of a POT Object is completed, the status of the POT Object is changed to the "dead" state. The POT Master will periodically delete dead POT Objects from memory at certain intervals. A POT Object may also have a "static" state in which it will never be executed, and is used for referencing its internal data from or to other POT Objects.

To implement a POT Object, a programmer only needs to specify when a POT Object is in any of the four states and allow for the creation of its "data-waiting" slot address(es), and the flow of data from one POT Object to another. The POT Engine will execute all POT Objects in an active state. Having multiple POT Objects in an active state implies that such POT Objects have no dependencies on each other and that they can be executed in parallel. If a POT Object is waiting for input from an external source, then this is equivalent to the state of waiting for a process awaiting results from other functions commonly found in conventional message-passing-based parallel processing systems, except that the waiting POT Object is not in active execution and does not tie up a processor resource. Therefore, the CPU can be busy executing the many other POT Objects that probably exist at the same time.

The programming of a POT Engine requires that a programmer first identify those areas of a large rendering task that can be grouped together as POT Spaces that do not require message passing from an external process in order to complete a POT Space computation, and then breaking up elemental tasks as POT Objects within a POT Space that are self-contained and can be executed in one computational step without requiring message passing to or from another object. Thus, a POT Object is generally characterized by a self-contained programmed sequence within an overall complex programmed application which has as its starting point the input of data being awaited, an uninterrupted computational step, and an output of the computational step on the input data.

Figure 14:
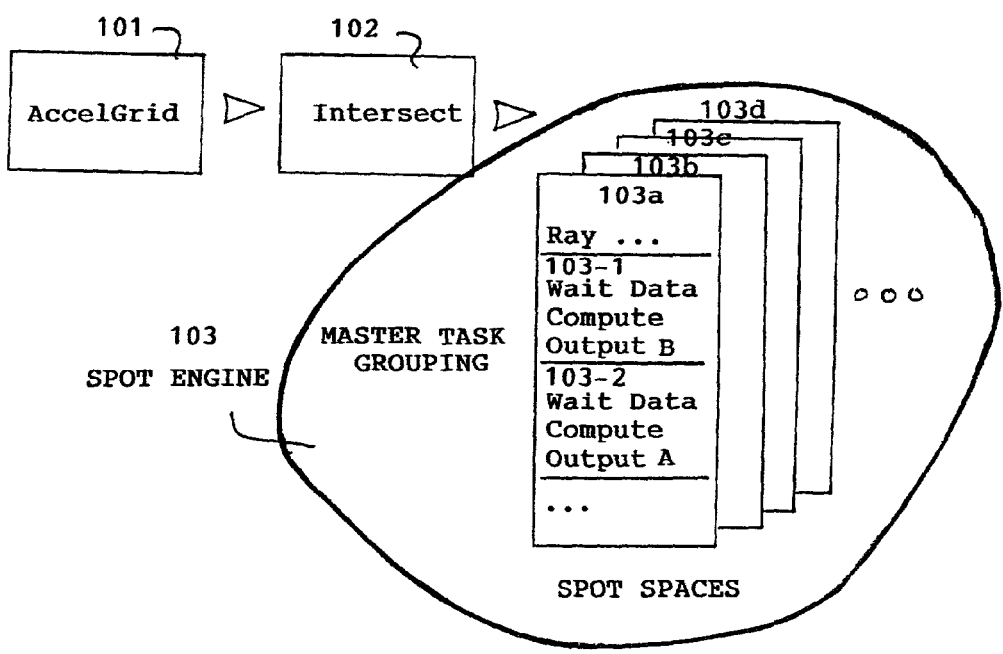
FIG. 14 is an illustration of shader task objects of a Shading SPOT Space in a CG rendering application.

In FIG. 14, an example is shown of two shader POT Objects defined within one of many shading tasks of a shading operation in a CG rendering application. The shading operation is initiated during a CG rendering application after an image frame of a scene has been defined, and the World Map data of the scene and objects therein ("Shot Data") are retrieved and held in a Depot to be used for shading of objects as they appear in the image frame (see FIG. 4). In Block 101, the AccelGrid function is called to narrow down the areas of the scene which will be scanned for intersecting objects. In Block 102, the Intersect function is called to find a point in the 3D scene that is intersected by traversal of eye rays from the viewer through the screen to the object in the 3D scene. When an intersecting point is found, the rendering program calls the shading function to derive the light and color with which the point will be shaded, based upon the light sources that impact the point in the scene. The shading function starts by determining the surface texture and characteristic of the point and generating a Shading POT (SPOT) Engine 103 for parallel processing of "ray-shooting" requests for light/color data from each light source. Each "ray-shooting" request can form a single Shading POT (SPOT) Space 103a of many such spaces 103b, 103c, 103d, . . .

Within each SPOT Space, there may be one or more SPOT Objects in which a message is passed to another process for return of data. In the example shown, one source of light on a point being shaded is from a point A, which in turn is illuminated by a nearby light source B. Thus, defined within SPOT Space 103a is a SPOT Object 103-1 which awaits data representing light source B and computes the light reflected from reflection surface A, and a SPOT Object 103-2 which awaits the result of computation of reflected light from SPOT Object 103-1 and computes the light and color values to be applied to the pixel representing that point on the object. In this manner, SPOT Objects are defined in each of the SPOT Spaces, and the SPOT Objects are processed by the SPOT Engine using the above-described method of parallel processing.

For standard shading tasks in CG rendering, templates representing different light shading models can be stored in a library for use by the programmer to easily program the SPOT Spaces and SPOT Objects. An example of the use of a shading template to implement a SPOT Engine for a shading task is provided in Appendix A hereto.

Because all the processing within a POT Engine is encoded in terms of POT Objects and POT Spaces, it requires significantly more memory than an ordinary sequential program. In order to conserve memory as much as possible, POT Objects which are no longer needed, i.e., dead objects, are quickly deleted from the POT Engine. This operation is programmed to be performed by the POT Engine automatically, so programmers do not need to concern themselves with explicitly freeing memory.

Under normal programming, when the POT Engine is used for some logic, each of POT Object, POT Space, and POT Master classes are inherited by new classes, and the necessary new data and functions are added. For example, the SPOT Engine class is created implementing the necessary data and functions for the shading engine, which apply to the SPOT Space and SPOT Master classes as well. For example, a new raytracing request that is required for shading is passed to other processes as a RayTracingRequest message, but this part is handled completely by the SPOT Master.

Figure 13:
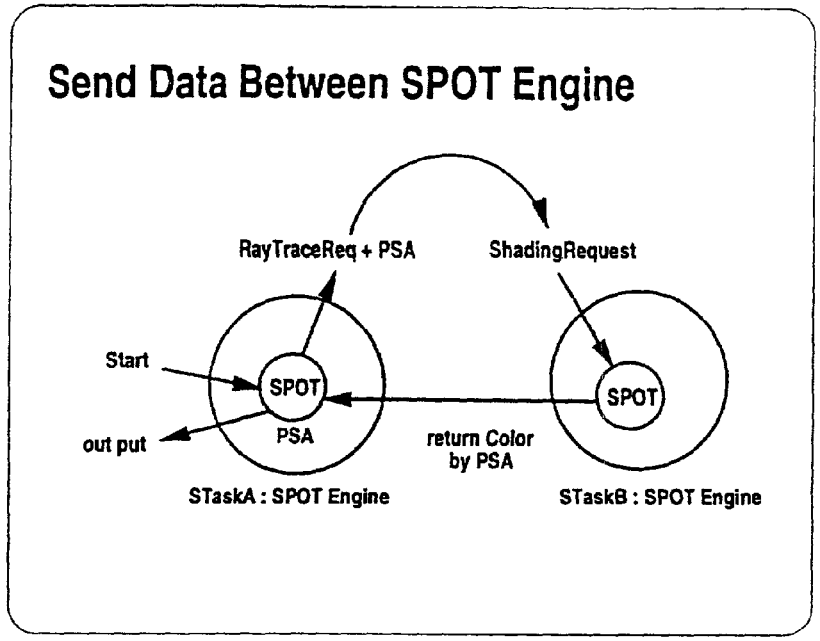
FIG. 13 is an illustration of sending data between task objects in different shading tasks.

A POT Engine may commonly need to be accessed from within another separate process. A POT Engine can send data to another POT Engine by maintaining a POT Space Address (PSA) listing. In a conventional sequential program, the program is executed within a single memory address space, so data access can easily be performed in the form of pointers. However, in the kinds of parallel processing using multiple processes that the POT Engine is expected to run under, such global addresses do not exist. Therefore, in order to set some data into a POT Engine that exists in a different process, the PSA listing method is used for specifying addresses within the POT Engine so that they can be accessed from within a different process. The PSA is a unique address ID defined only within that POT Engine itself, so by using that address indexed to a specific POT Engine, access to the correct memory space address can be performed in a safe manner. This is illustrated in FIG. 13, in which the SPOT Engine for Shader Task A sends a RayTrace request and PSA address for return of data to the SPOT Engine for Shader Task B, which can then return a color result to the indicated PSA and SPOT Engine.

In order to use the POT Engine, programmers will be inheriting from the POT class as necessary. Therefore, it is difficult to determine the data size of the POT Objects which exists within the POT Engine until runtime. Because of its architecture, the POT Engine allocates a large number of POT Objects internally which changes dynamically. This requires a dynamic allocation of memory, and in actual use, the system will have to handle a large number of POT Objects of differing sizes. Therefore, having a fast, efficient memory management is an extremely important issue. Therefore, the POT Engine is designed to contain its own memory management functionality, which realizes a faster performance than the default memory management implemented in the operating system. This memory management system is built to be thread-safe, in order to be able to deal with parallel processing correctly.

Analysis of the POT Engine operation is often necessary for analyzing the overall system performance. By analyzing how often and how fast a POT Object is being created and processed, it is possible to determine where bottlenecks occur in the system and what kinds of improvements will be effective. For this purpose, a POT Engine can be designed to profile its own execution and log its performance. It is possible to dump such data in real-time or check the performance at the end, which allows the system to monitor the rate at which the tasks are being performed. This feature is effective for tuning the overall performance of the system.

Other Applications

Besides CG rendering, the POT methodology can also be applied to other parallel processing applications, such as: (1) Simulation Programs; (2) Particle Simulator; (3) Physical Phenomenon Simulator; (4) Fluid Simulator; (5) Circuit Simulator. The POT Engine methodology is applicable in general to simulation programs where parallel processing is possible, and has an especially high affinity for tasks which require message passing. Certain simulations require independent sets of large amounts of computation, and there is a lot of merit to implementing such tasks on workstation clusters where multiple machines are connected over a generic network. Being able to take advantage of free CPU time in environments where there are many workstations, not all of which are performing a useful task 24 hours a day, is especially advantageous. In such situations, message passing between multiple CPUs are required, and the logic driving such programs require massive waiting queue characteristics as well as the ability to execute multiple objects concurrently. The POT Engine fulfills all of these requirements effectively.

The POT Engine technology is also applicable for network games where multiple machines are connected and communicate with each other over a network. Such systems can be broken down into two major programs. One is the server process, and the other is the client process. The client side is where the human player actually interacts with the computer, and the server handles the events coming from multiple client processes. In both processes, being able to maintain a high level of parallelism and ensuring a good response speed for the user is essential to the game's success. For example, the server process requires extreme parallelism as well as a massive queue structure for the events waiting for a reaction. Both of these are well matched with the POT Engine's basic traits, and good results can be expected by implementing such servers on top of the POT Engine. Additionally, if the load on the server cannot be handled by a single server process, then the server functionality may have to be distributed over several processes, or the server may need to be implemented in such a way that multiple processes function as a single server program. In such cases, overall stability of the system and performance gains can be expected without losing POT Engine's advantages. The POT Engine may also be used on the client side where queue structures are required, such as in an event handling, and should be effective in all other operations where parallel processing and wait queue structures are required simultaneously.

In an application using multiple CPUs, where the load on one process becomes extremely high, while other processes are mostly idle, it may be desirable to move some of the computation from the overloaded process to the other processes. If the application is implemented using POT Engines for the independent processes, then the overloaded POT Engine can transfer some of its load to the idle POT Engines. Because each POT Engine has a PSA address space unique to its system, identical results can be guaranteed after transferring tasks from one POT Engine to another. However, this requires that the originating POT Engine keep the information about the transferred tasks in order to determine the destination of the results of the transferred tasks.

Some applications, for example, circuit simulators and physical phenomenon simulators, require the clocking of time as a part of the computation, necessitating some virtual time computation for all POT Engines. Generally, such times are determined virtually within the computation. In other cases, continuous time is broken down into very short periods (steps), and computation is performed by taking a large number of discrete samples. Adapting such problems to the POT Engine is possible by adding the clocking of time to every POT Object and POT Engine. POT Objects within the POT Engine can be waiting or running depending on its state. Whether it is ready to run depends largely on the status of the slots defined for the POT Object. When data is set for all the defined slots of the POT Object, that particular POT Object will be executed. Time can be added as a slot for determining whether the POT Object is ready to execute, as well as to record the POT Object's local time within itself. In addition, a global time common to every POT Engine can be maintained.

In summary, by using the POT Engine methodology for intensive computation, the CPU wait problem that occurs in message passing-based parallel processing systems can be solved. Especially when there are large number of messages, most of the CPU's wait times can be eliminated, and this methodology has been demonstrated to work effectively for computations with very large latency. Also, for processing large number of messages in parallel, because the POT Engine tries very strongly to execute parallel processing, it became possible for a system to inherently possess parallel processing capabilities. Until now, programming any logic required a separate design in how the parallel processing would be maintained and implemented, but by using the POT methodology and implementing the processing on top of that, the need for complex individual design of the system functions can be eliminated, and programmers can focus on the more important, core functionality of the processing objects to be carried out in the particular application. The POT methodology in effect implements a highly effective queuing system for dealing with the CPU wait problem, instead of trying to implement a specific solution for each type of processing application.

It is understood that many other modifications and variations may be devised given the above description of the principles of the invention. It is intended that all such modifications and variations be considered as within the spirit and scope of this invention, as defined in the following claims.

I claim:

1. A parallel processing method for performing computer graphics shading tasks in parallel on a plurality of processors comprising:

(a) identifying at least one shading task area of a large computer graphics rendering task directed to a plurality of computer shading task processes for shading an image frame of a scene that can be grouped together as a shading task space not dependent on passing of control of processing from an external process in order to complete processing of a computational processes of the shading task space;

(b) breaking down the shading task space into a plurality of self-contained shading task objects each of which can be executed in one computational step without requiring passing of control to or from another object, wherein each shading task object is defined with a computational step and at least one "data-waiting" slot for receipt of data requested from another shading task object to which the shading task object passes a message for the requested data, and wherein once all the "data-waiting" slots of a shading task object are filled by respective return message(s), the shading task object can perform its defined computational step without waiting for any other input;

(c) scheduling the defined shading task objects of said identified shading task space so that each shading task object ready for processing is processed by a next available "unoccupied" one of the plurality of processors, by the sequence of:

(i) placing a shading task object with an unfilled "data-waiting" slot in a "waiting" state in which it is not assigned to any processor;

(ii) changing the status of a shading task object to an "active" state when all of its defined "data-waiting" slots have been filled, wherein it is assigned to a next available processor in an "unoccupied" state, then placing that processor's status in an "occupied" state; and (iii) changing the status of the shading task object to a "dead" state when the computational step to be performed for shading the task object by the assigned processor has been completed, and then changing the processor's status to an "unoccupied" state to be assigned to a next "active" shading task object.

2. A parallel processing method according to claim 1, wherein a master shading task grouping is defined by a plurality of shading task spaces each of which contains multiple shading task objects and does not require passing of control from an external source in order to complete computation for the respective shading task space.

3. A parallel processing method according to claim 2, wherein all shading task objects of the shading task spaces which are in an "active" state are placed in a processing queue and each is assigned in turn to a next available "unoccupied" processor.

4. A parallel processing method according to claim 3, wherein a master engine for the master shading task grouping maintains threads which track the processing of shading task objects in each of the shading task spaces.

5. A parallel processing method according to claim 4, wherein the master engine for the master shading task grouping maintains an internal space address assigned to each respective shading task object.

6. A parallel processing method according to claim 5, wherein a shading task object in one master shading task grouping can exchange data with a shading task object in another master shading task grouping by providing its internal space address indexed to its master shading task grouping.

7. A parallel processing method according to claim 1, wherein the shading task includes a master shading task grouping of shading task area spaces each of which performs shading of a pixel in the image frame.

8. A parallel processing method according to claim 7, wherein each shading task space includes a plurality of "pixel shading" task objects for performing shading of the pixel based upon ray shooting from light sources in the scene, and a "compositing" task object for compositing the shading results for the pixel.

9. A parallel processing method according to claim 8, wherein each shading task object has at least one "data-waiting" slot for return of data characterizing light emitted from a respective light source in the scene.

10. A parallel processing method according to claim 8, wherein the rendering task includes a function for receiving scene data for a "world map" of the scene, a function for defining the scene objects in each frame of the scene, a function for defining the pixels of an object in the scene intersected by an eye ray of a viewer of the scene, and a function for tiling together the shading results returned by each of the master shading task groupings for respective objects in the image frame.

11. A software programming method for performing computer graphics shading tasks in parallel on a plurality of processors comprising:

(a) identifying at least one shading task area of a large computer graphics rendering task directed to a plurality of computer shading task processes for shading an image frame of a scene that can be grouped together as a shading task space not dependent on passing of control of processing from an external process in order to complete processing of a computational processes of the shading task space;

(b) breaking down the shading task space into a plurality of self-contained shading task objects each of which can be executed in one computational step without requiring passing of control to or from another object, wherein each shading task object is defined with a computational step and at least one "data-waiting" slot for receipt of data requested from another shading task object to which the shading task object passes a message for the requested data, and wherein once all the "data-waiting" slots of a shading task object are filled by the respective return message(s), the shading task object can perform its defined computational step without waiting for any other input;

(c) scheduling the defined shading task objects of said identified shading task space so that each shading task object ready for processing is processed by a next available "unoccupied" one of the plurality of processors, by the sequence of:
(i) placing a shading task object with an unfilled "data-waiting" slot in a "waiting" state in which it is not assigned to any processor; all of its defined "data-waiting" slots have been filled, wherein it is assigned to a next available processor in "unoccupied" state, then placing that processor's status in an "occupied" state; and changing the status of the shading task object to a "dead" state when the computational step to be performed for the shading task object by the assigned processor has been completed, and then changing the processor's status to an "unoccupied" state to be assigned to a next "active" shading task object.

12. A software programming method according to claim 11, wherein a master shading task grouping is defined by a plurality of shading task spaces each of which contains multiple shading task objects and does not require passing of control from an external source in order to complete computation for the respective shading task space.

13. A software programming method according to claim 12, wherein all shading task objects of the shading task spaces which are in an "active" state are placed in a processing queue and each is assigned in turn to a next available "unoccupied" processor.

14. A software programming method according to claim 13, wherein a master engine for the master shading task grouping maintains threads which track the processing of shading task objects in each of the shading task spaces.

15. A software programming method according to claim 14, wherein the master engine for the master shading task grouping maintains an internal space address assigned to each respective shading task object.

16. A software programming method according to claim 15, wherein a shading task object in one master shading task grouping can exchange data with a shading task object in another master shading task grouping by providing its internal space address indexed to its master shading task grouping.

17. A software programming method according to claim 11, further comprising storing templates for different types of task engines, spaces, and objects in a library and utilizing the templates to generate software programming for a desired processing task.

18. A software programming method according to claim 11, wherein the shading task processes includes a master task grouping of shading task spaces each of which performs shading of a pixel in the image frame.

* * * * *